Sept. 17, 1929.   J. H. DE BOER   1,728,230
PROCESS OF PREPARING FLUORINE
Filed Aug. 18, 1926
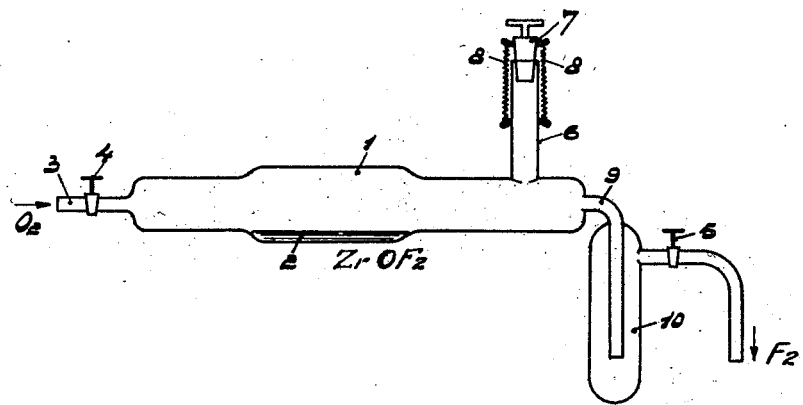
INVENTOR
J. H. de BOER
By Langner, Parry, Card & Langner
Attys.

Patented Sept. 17, 1929

1,728,230

UNITED STATES PATENT OFFICE

JAN HENDRIK DE BOER, OF EINDHOVEN, NETHERLANDS, ASSIGNOR TO N. V. PHILIPS' GLOEILAMPENFABRIEKEN, OF EINDHOVEN, NETHERLANDS

PROCESS OF PREPARING FLUORINE

Application filed August 18, 1926, Serial No. 130,043, and in the Netherlands October 28, 1925.

This invention relates to a process of preparing fluorine. According to the usual methods fluorine is prepared by means of the electrolysis of liquids containing hydrofluoric acid. These methods have the disadvantage that they must be carried out in vessels made of lead, copper or platinum since the usual materials such as glass can not resist the action of hydrofluoric acid.

Applicant has found a method whereby it is possible to prepare fluorine without using hydrofluoric acid. The process according to the invention consists in heating one or more compounds of titanium, zirconium or hafnium with fluorine and oxygen in the presence of oxygen, which may be supplied to the said compounds in different ways. First, the oxygen may be supplied as such but also the said compounds may be mixed with a substance that when heated develops oxygen. For example, a peroxide may be used for this purpose.

The process according to the invention will be more clearly understood by referring to the accompanying drawing. At 2 zirconium oxyfluoride is disposed in a glass vessel 1 of known construction, having an upstanding tubular portion 6 provided with a safety stopper 7 normally held closed by means of a spring 8 which yields against excessive pressure in said vessel. Said vessel is provided with an outlet tube 9 dipping into a trap 10 which may be filled with any suitable filling liquid, for scrubbing or otherwise purifying the gas. While this part of the apparatus is illustrated in the drawing, it is understood that it is merely a conventional piece of laboratory apparatus, and that any other suitably designed apparatus may be used for the carrying out of the present invention. Zirconium oxyfluoride can be prepared by adding hydrofluoric acid to zirconium metal, by evaporating this solution to dryness and by preparing an aqueous solution of the compounds so obtained. When boiling such a solution zirconium oxyfluoride will be precipitated. The oxygen which beforehand has been dried in a suitable manner, for example, with the aid of sulfuric acid and liquid air, is introduced into the apparatus by means of a tube 3 which can be shut with the aid of a valve 4. When the air has been removed from the apparatus and the latter only contains oxygen, the two valves 4 and 5 are closed and the tube 1 is heated in an electric furnace to a temperature above 200° C. owing to which the reaction takes place and fluorine is developed.

What I claim is:

1. A process of preparing fluorine, comprising heating at least one of the compounds of an element of the first column of the fourth group of the periodic system, having an atomic number, which is smaller than 90, with fluorine and oxygen; in the presence of oxygen.

2. A process of preparing fluorine, comprising heating at least one of the compounds of an element of the first column of the fourth group of the periodic system, having an atomic number which is smaller than 90, with fluorine and oxygen; together with a substance that when heated, develops oxygen.

In testimony whereof I affix my signature, at the city of Eindhoven, this 4th day of August, 1926.

JAN HENDRIK DE BOER.